United States Patent
Han

(10) Patent No.: US 11,433,308 B2
(45) Date of Patent: Sep. 6, 2022

(54) DEVICE FOR INCREASING PROCESSING SPEED OF GAME IMPLEMENTING MULTIPLE THREADS AND METHOD THEREFOR

(71) Applicant: KRAFTON, Inc., Seongnam-si (KR)

(72) Inventor: Seung-Hwan Han, Incheon (KR)

(73) Assignee: KRAFTON, Inc., Seongnam-si (KR)

( * ) Notice: Subject to any disclaimer, the term of this patent is extended or adjusted under 35 U.S.C. 154(b) by 2 days.

(21) Appl. No.: 16/979,974

(22) PCT Filed: Mar. 13, 2019

(86) PCT No.: PCT/KR2019/002871
§ 371 (c)(1),
(2) Date: Sep. 11, 2020

(87) PCT Pub. No.: WO2019/177351
PCT Pub. Date: Sep. 19, 2019

(65) Prior Publication Data
US 2021/0008453 A1    Jan. 14, 2021

(30) Foreign Application Priority Data

Mar. 14, 2018 (KR) .................. KR10-2018-0029898

(51) Int. Cl.
*A63F 13/573* (2014.01)
*A63F 13/35* (2014.01)
*A63F 13/577* (2014.01)

(52) U.S. Cl.
CPC ............ *A63F 13/573* (2014.09); *A63F 13/35* (2014.09); *A63F 13/577* (2014.09)

(58) Field of Classification Search
CPC ....... A63F 13/577; A63F 13/573; A63F 13/35
See application file for complete search history.

(56) References Cited

U.S. PATENT DOCUMENTS 6,468,157 B1 * 10/2002 Hinami .................. A63F 13/10
463/32
6,664,965 B1 * 12/2003 Yamamoto ............ G06T 15/005
345/473

(Continued)

FOREIGN PATENT DOCUMENTS

JP      08-229239 A      9/1996
JP      2000-218042 A    8/2000

(Continued)

OTHER PUBLICATIONS

International Search Report dated Jul. 4, 2019 in International Application No. PCT/KR2019/002871.

*Primary Examiner* — Reginald A Renwick
(74) *Attorney, Agent, or Firm* — Saliwanchik, Lloyd & Eisenschenk

(57) ABSTRACT

The present disclosure relates to an apparatus and method for improving the processing speed of a game implementing multithreaded, characterized to include a moving object trajectory generator that generates a moving trajectory of a moving object in a reference terrain coordinates system that is based on a space that the game provides, when the moving object moves in the space that the game provides according to a game player's manipulation; an aircraft involvement recognizer that recognizes involvement of an aircraft in the space that the game provides; an aircraft area setter that sets an aircraft area where the aircraft is involved in the space that the game provides, when the involvement of the aircraft is recognized in the space that the game provides; a moving object entry determiner that determines whether the moving object entered into the aircraft area in the space that the game provides; a terrain data manager that provides aircraft terrain data that is based on the aircraft, when it is determined that the moving object entered into the aircraft area;

(Continued)

and a collision location decider that decides a collision location of the moving object using the aircraft terrain data.

10 Claims, 4 Drawing Sheets

(56) References Cited

U.S. PATENT DOCUMENTS

| | | | | |
|---|---|---|---|---|
| 8,882,559 | B2* | 11/2014 | Fessenmaier | A63H 30/04 446/454 |
| 8,882,560 | B2* | 11/2014 | Sofman | A63H 30/04 446/456 |
| 2005/0186884 | A1* | 8/2005 | Evans | A63H 30/04 446/456 |
| 2010/0009733 | A1* | 1/2010 | Garvin | A63F 13/525 463/5 |
| 2011/0304617 | A1* | 12/2011 | Nishida | A63F 13/5258 345/419 |
| 2015/0031421 | A1* | 1/2015 | Jo | A63F 13/30 463/2 |
| 2015/0094127 | A1* | 4/2015 | Canose | G06F 3/04842 463/2 |
| 2019/0336863 | A1* | 11/2019 | Hayashi | A63F 13/2145 |

FOREIGN PATENT DOCUMENTS

| | | |
|---|---|---|
| JP | 2013-030125 A | 2/2013 |
| KR | 10-2009-0096324 A | 9/2009 |
| KR | 10-2013-0049486 A | 5/2013 |

* cited by examiner

DEVICE FOR INCREASING PROCESSING SPEED OF GAME IMPLEMENTING MULTIPLE THREADS AND METHOD THEREFOR

CROSS-REFERENCE TO RELATED APPLICATIONS

This application is the U.S. national stage application of International Patent Application No. PCT/KR2019/002871, filed Mar. 13, 2019, which claims the benefit under 35 U.S.C. § 119 of Korean Patent Application No. 10-2018-0029898, filed Mar. 14, 2018, the disclosures of each of which are incorporated herein by reference in their entirety.

1. FIELD

The present disclosure relates to an apparatus and method for improving the processing speed of a game implementing multithreaded. More specifically, the present disclosure relates to an apparatus and method for improving the processing speed of a game that, when it is determined that a moving object and an aircraft collided in a space provided in the game, provides terrain data that is based on the aircraft instead of an existing terrain data, thereby implementing multithreaded.

2. BACKGROUND

Due to the recent development of high-speed data communication networks and the development of related technologies such as graphics and sound, many people use the Internet, and with the increase of Internet use, various types of content services using the Internet, for example, messengers, shopping malls, and games are being provided. Among various content services, in particular, in the field of game services, the speed of development and spread of services is rapidly increasing, so many Internet users are using online game services of various methods through the Internet. Rather than just being independently executed on a personal computer (PC), computer games are developing into the form of online games that allow users to access servers and enjoy the games through various communication networks such as the Internet or mobile communication networks.

Online games are games that can be played by accessing a server that the game creator provides, through a desktop computer, notebook computer or mobile communication terminal and the like.

Currently, various role playing games (RPGs) are being developed on the market. An RPG game refers to a type of game in which the game user becomes a character appearing in the game and plays the role of the character in the space (terrain) provided in the game.

These RPG games are largely divided into Massive Multiplayer Online Role Playing Games (MMORPGs) and Multiplayer Online Role Playing Games (MORPGs). MMORPG is based on a seamless (open world) world, where interactions between a large number of users occur. MORPG is based on a zone method world, where only one person or his party members can enter the zone and interactions between limited users occur. In creating maps for such RPG games, terrains take up a significant portion. A terrain refers to a space where an avatar such as a character or an object will be expressed.

Meanwhile, if a separate aircraft is involved in the space provided in the game, the terrain data must be modified or changed. Here, in games that support multithread, there is a problem that the processing speed of the game slows down while the terrain data is being modified or changed.

SUMMARY

Therefore, a purpose of the present disclosure is to solve the aforementioned problems of prior art, that is, in a case where an aircraft involvement is recognized in the space provided in the game, if coordinates information of a moving trajectory of a moving object is included in the area where the aircraft is involved, to determine that the moving object entered into the area where the aircraft is involved, and improve the processing speed of the game.

Further, another purpose of the present disclosure is to improve the processing speed of the game by providing terrain data that is based on the aircraft instead of existing terrain data, when it is determined that the moving object entered into the area where the aircraft is involved.

Further, another purpose of the present disclosure is to improve the processing speed of the game by determining whether the moving object that entered into the area where the aircraft is involved and the aircraft will collide using the terrain data that is based on the aircraft.

An apparatus for improving the processing speed of a game implementing multithreaded according to an embodiment of the present disclosure for achieving the purposes described above is characterized to include a moving object trajectory generator that generates a moving trajectory of a moving object in a reference terrain coordinates system that is based on a space that the game provides, when the moving object moves in the space that the game provides according to a game player's manipulation; an aircraft involvement recognizer that recognizes involvement of an aircraft in the space that the game provides; an aircraft area setter that sets an aircraft area where the aircraft is involved in the space that the game provides, when the involvement of the aircraft is recognized in the space that the game provides; a moving object entry determiner that determines whether the moving object entered into the aircraft area in the space that the game provides; a terrain data manager that provides aircraft terrain data that is based on the aircraft, when it is determined that the moving object entered into the aircraft area; and a collision location decider that decides a collision location of the moving object using the aircraft terrain data.

The aircraft area setter may set the aircraft area according to a location and shape of the aircraft.

The moving object entry determiner may include a moving object entry decider that decides that the moving object entered into the aircraft area, when, as a result of comparing coordinates of the moving trajectory and a coordinates range of the aircraft area, the coordinates of the moving trajectory are included in the coordinates range of the aircraft area.

The collision location decider may include a reference terrain collision location decider that decides a collision location in reference terrain data that is based on the space that the game provides; and an aircraft collision location decider that decides the collision location in aircraft terrain data.

The aircraft collision location decider may include a moving trajectory converter that converts the moving trajectory in the reference terrain coordinates system into the moving trajectory in an aircraft terrain coordinates system, and the aircraft collision location decider decides the collision location using converted coordinates of the moving trajectory and aircraft geometry coordinates of the aircraft terrain data.

A method for improving the processing speed of a game implementing multithreaded according to an embodiment of the present disclosure is characterized to include generating, by a moving object trajectory generator, a moving trajectory of a moving object in a reference terrain coordinates system that is based on a space that the game provides, when the moving object moves in the space that the game provides, according to a game player's manipulation; recognizing, by an aircraft involvement recognizer, involvement of an aircraft in the space that the game provides; setting, by an aircraft area setter, an aircraft area where the aircraft is involved in the space that the game provides, when the involvement of the aircraft is recognized; determining, by a moving object entry determiner, whether the moving object entered into the aircraft area where the aircraft is involved in the space that the game provides; providing, by a terrain data manager, aircraft terrain data that is based on the aircraft, when it is determined that the moving object entered into the aircraft area; and deciding, by a collision location decider, a collision location of the moving object using the aircraft terrain data.

The determining whether the moving object entered into the aircraft area may include comparing coordinates range information of the aircraft area and coordinates of the moving trajectory of the moving object; and determining that the moving object entered into the aircraft area, when, as a result of the comparison, the coordinates of the moving trajectory of the moving object are included in the coordinates range information of the aircraft area, and determining that the moving object did not enter into the aircraft area, when the coordinates of the moving trajectory of the moving object are not included in the coordinates range information of the aircraft area.

The deciding the collision location of the moving object may include deciding the collision location in aircraft terrain data, when the moving object entered into the aircraft area; and deciding the collision location in reference terrain data that is based on the space that the game provides, when the moving object did not enter into the aircraft area.

The deciding the collision location in the aircraft terrain data may include converting the moving trajectory in the reference terrain coordinates system into the moving trajectory in an aircraft terrain coordinates system that is based on the aircraft; comparing the converted coordinates of the moving trajectory and aircraft geometry coordinates in the aircraft terrain data; and when, as a result of the comparison, converted coordinates of the moving trajectory and the aircraft geometry coordinates overlap each other, determining the overlapping coordinates as the collision location, and when the converted coordinates of the moving trajectory and the aircraft geometry coordinates do to overlap each other, proceeding to determining the collision location in the reference terrain data.

The method for improving the processing speed of a game implementing multithreaded according to an embodiment of the present disclosure may provide a result of an event regarding changes of objects existing near the collision location and the collision location.

An apparatus and method for improving the processing speed of a game implementing multithreaded according to the present disclosure having the configuration as described above need not modify the existing terrain data when the moving object and the aircraft collide due to involvement of the aircraft, and may thus improve the processing speed of the game.

Further, due to the improvement of the game processing speed, there is an effect of enabling implementation of an RPG game where aircrafts are applied.

DETAILED DESCRIPTION

Figure 1:
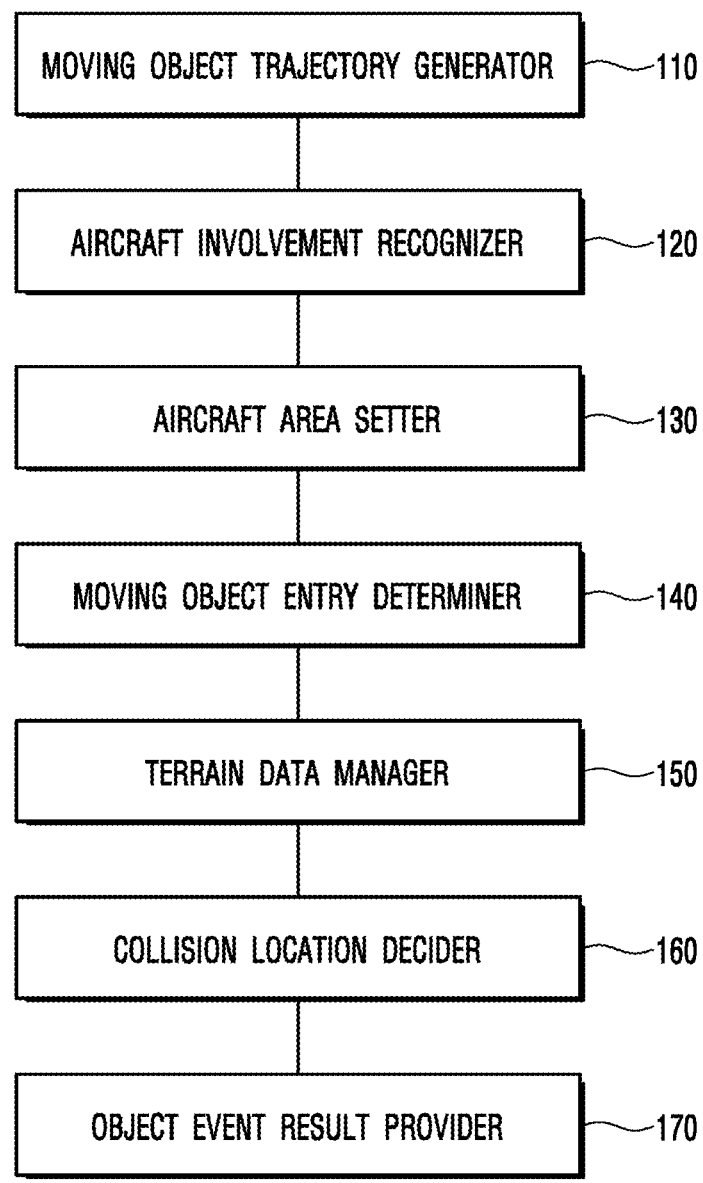
FIG. 1 is a view for describing a configuration of an apparatus according to an embodiment of the present disclosure.

The present disclosure may be modified in various forms, and may have numerous embodiments, and therefore, specific embodiments will be exemplified in the drawings and described in detail hereinbelow.

However, it should be understood that this is not to limit the present disclosure to certain embodied forms, but that all the modifications, equivalents and alternatives that may be included in the spirit and technological scope of the present disclosure are included. Like reference numerals indicate like components.

It should be understood that if any component is mentioned to be "connected" or "accessed" to another component, the component may be directly connected or directly accessed to the other component, but there may exist another component in between as well. On the other hand, it should be understood that if any component is mentioned to be "directly connected" or "directly accessed" to another component, there is no other component in between.

Terms used in the present specification are used to merely describe certain embodiments, and not to limit the present disclosure. It should be understood that singular expressions include plural expressions and do not exclude the possibility of presence or addition of combinations thereof. In the present specification, terms such as "include/comprise" or "has/have" are used to designate that the features, numbers, steps, operations, components, parts or combinations thereof disclosed in the specification are present, and not to limit thereto, and thus one or more other features, numbers, steps, operations, components, parts or combinations thereof may be further included.

Hereinbelow, referring to the drawings attached, preferable embodiments of the present disclosure will be described in further detail. Hereinbelow, like reference numerals indicate like components, and repetitive description of like components will be omitted.

In the specification of the present disclosure, a "game" means a software that one or more gamers can enjoy using an input apparatus mounted or connected onto a gaming device. Generally, a game is proceeded in the method of directly manipulating a player character or by manipulating the movement of an object in the game, etc., and games may be classified by their genre, for example, roll playing, adventure, arcade, etc.

Further, in the specification of the present disclosure, a "gaming device" means a hardware that executes a game software, performs computation according to a user's input through an input device, and outputs a result through an output device. For example, the gaming device may have the form of a wearable device such as personal computer, laptop computer, game console, smart phone, tablet PC, smart band or smart watch, etc. Besides the aforementioned, any hardware that satisfies the aforementioned definition may be a gaming device.

FIG. 1 is a view for describing a configuration of an apparatus for improving the processing speed of a game implementing multithreaded according to the present disclosure.

Referring to FIG. 1, an apparatus for improving the processing speed of a game implementing multithreaded largely includes a moving object trajectory generator 110, an aircraft involvement recognizer 120, an aircraft area setter 130, a moving object entry determiner 140, a terrain data manager 150, a collision location decider 160, and an object event result provider 170.

When the moving object moves in the space (for example, a continent) that the game provides, according to a manipulation by a game player, the moving object trajectory generator 110 generates a moving trajectory of the corresponding moving object. Here, the moving object may be the game player unit itself, or a tool, a weapon, or a projectile that the game player unit possessed, but there is no limitation thereto, and thus the moving object may include any object that is able to move and collide with an aircraft.

The moving object trajectory generator 110 generates a moving trajectory of the moving object in a reference terrain coordinates system that is based on the space that the game provides, and the moving trajectory may include coordinates (X, Y, Z) information.

The aircraft involvement recognizer 120 recognizes involvement of the aircraft in the space that the game provides. Here, the aircraft may include all objects such as airships that a game player unit can board in the air of the space that the game provides. The aircraft area setter 130 is for setting an area where the aircraft is involved in the space that the game provides when involvement of the aircraft is recognized in the space that the game provides. The aircraft area is an area where the aircraft exists, and may be represented by coordinates range information of where the aircraft exists. More specifically, the aircraft area setter 130 may set the aircraft area according to a location of the aircraft (or a flying route) and a predetermined shape of the aircraft.

The moving object entry determiner 140 determines whether the moving object entered into the aircraft area in the space that the game provides.

The moving object entry determiner 140 compares the coordinates range information of the aircraft area and the coordinates information of the moving trajectory of the moving object, and determines whether the coordinates information of the moving trajectory of the moving object is included in the coordinates range information of the aircraft area, to determine whether the moving object entered into the aircraft area.

The terrain data manager 150 manages the reference terrain data that is based on the space that the game provides and aircraft terrain data that is based on the aircraft. Here, the reference terrain data and the aircraft terrain data are pre-generated and stored data.

When it is determined that the moving object entered into the aircraft area, the terrain data manager 150 provides the aircraft terrain data instead of the reference terrain data. In addition, when it is determined afterwards that the moving object passed the aircraft without colliding with the aircraft, the terrain data manager 150 may provide the reference terrain data again.

The collision location decider 160 decides a collision location of the moving object.

If it is determined by the moving object entry determiner 140 that the moving object entered into the aircraft area, the collision location decider 160 decides the collision location of the moving object and the aircraft using the aircraft terrain data provided by the terrain data manager 150.

More specifically, the collision location decider converts the moving trajectory of the moving object generated in the reference terrain coordinates system into a moving trajectory in the aircraft terrain coordinates system using the aircraft terrain data. In addition, the collision location decider decides the collision location of the moving object and the aircraft by figuring out an overlapping location of the converted coordinates of the moving trajectory of the moving object and the aircraft geometry coordinates. When the collision location of the moving object and the aircraft is decided by the collision location decider 160, the decided collision location information may be provided to the gaming device and the like.

If the converted coordinates of the moving trajectory of the moving object and the aircraft geometry coordinates do not overlap each other, the collision location decider 160 determines that the moving object passed the aircraft without colliding with the aircraft. In addition, the collision location decider 160 decides the collision location of the moving object based on the reference terrain data. Here, the collision location decider 160 may notify the terrain data manager 150 that the moving object and the aircraft did not collide with each other and may be provided with the reference terrain data once again or figure out the collision location of the moving object using the already provided reference terrain data.

The object event result provider 170 provides the gaming device with an event result regarding changes of objects existing near the collision location according to the collision location of the moving object.

Figure 2:
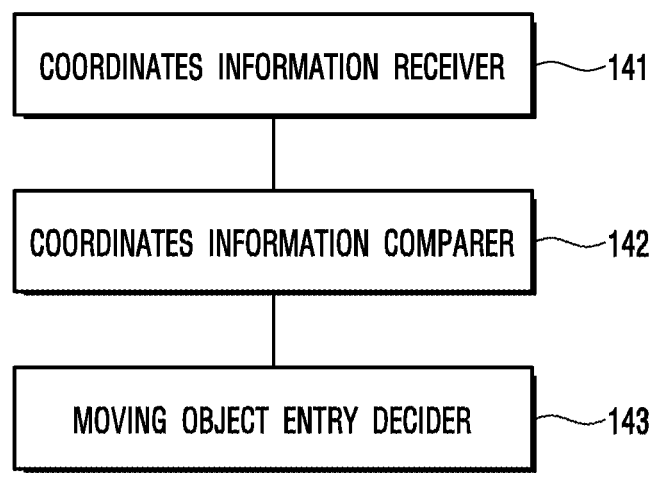
FIG. 2 is a view for describing a detailed configuration of a moving object entry determiner that may be applied to the apparatus according to an embodiment of the present disclosure.

FIG. 2 is a view for describing a detailed configuration of the moving object entry determiner that may be applied to the apparatus for improving the processing speed of a game implementing multithreaded according to the present disclosure.

Referring to FIG. 2, the moving object entry determiner 140 according to the present disclosure 140 determines whether the moving object entered into the aircraft area where the aircraft is involved in the space that the game provides.

For this purpose, the moving object entry determiner 140 includes a coordinates information receiver 141, a coordinates information comparer 142, and a moving object entry decider 143.

The coordinates information receiver 141 receives coordinates range information of the aircraft area where the aircraft is involved and coordinates information of the moving trajectory of the moving object.

The coordinates information comparer 142 compares the coordinates range information of the aircraft area and the coordinates information of the moving trajectory of the moving object.

If, as a result of comparison, the coordinates information of the moving trajectory of the moving object is included in the coordinates range information of the aircraft area, the moving object entry decider 143 decides that the moving object entered into the area where the aircraft is involved. On the other hand, if, as a result of comparison, the coordinates information of the moving trajectory of the moving object is not included in the coordinates range information of the aircraft area, the moving object entry decider 143 decides that the moving object did not enter into the area where the aircraft is involved.

Figure 3:
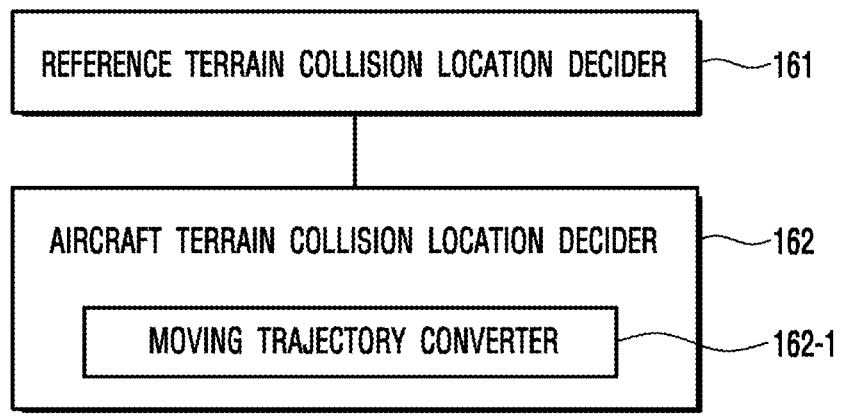
FIG. 3 is a view for describing a detailed configuration of a collision location decider that may be applied to the apparatus according to an embodiment of the present disclosure.

FIG. 3 is a view for describing a detailed configuration of the collision location decider 160 that may be applied to the apparatus for improving the processing speed of a game implementing multithreaded according to the present disclosure.

Referring to FIG. 3, the collision location decider 160 according to the present disclosure decides the collision location of where the moving object collided. Depending on an object of collision, either the moving object or the object of collision may be damaged, and the collision location may be decided in order to, for example, compute such object of damage and degree of damage.

For this purpose, the collision location decider 160 may be configured to include a reference terrain collision location decider 161 and an aircraft collision location decider 162.

In a case where there is no involvement of the aircraft, or even when the aircraft is involved, if the moving object did not enter into the aircraft area, the reference terrain collision location decider 161 decides the collision location in which location the moving object collided in the reference terrain according to the moving trajectory of the moving object received from the moving object trajectory generator 110.

When it is determined by the moving object entry determiner 140 that the moving object entered into the aircraft area, the aircraft collision location decider 162 decides the collision location in which part of the aircraft the moving object collided using the aircraft terrain data provided from the terrain data manager 150.

The aircraft terrain data is terrain data that is based on the aircraft, and in the aircraft terrain data, the aircraft remains stationary. Therefore, it is possible to determine whether the moving object collides with the aircraft only when the moving trajectory of the moving object generated in the reference terrain coordinates system is converted into a moving trajectory in the aircraft terrain coordinates system that is based on the aircraft terrain data.

For this purpose, the aircraft collision location decider 162 includes a moving trajectory converter 162-1.

The moving trajectory converter 162-1 converts the moving trajectory of the moving object generated in the reference terrain coordinates system into the moving trajectory in the aircraft terrain coordinates system.

More specifically, the moving trajectory converter 162-1 converts the moving trajectory of the moving object according to positional relationship between an original point of the reference terrain and the aircraft, and the converted moving trajectory becomes the moving trajectory of the moving object seen from the aircraft.

Further, the aircraft terrain data includes coordinates data regarding the specific shape of the aircraft. Therefore, the aircraft collision location decider 162 figures out the overlapping location of the converted coordinates of the moving trajectory of the moving object and the aircraft geometry coordinates, and decides the collision location of the moving object and the aircraft.

On the other hand, if the converted coordinates of the moving trajectory of the moving object and the aircraft geometry coordinates do not overlap each other, it is determined that the moving object passed the aircraft without colliding with the aircraft. In addition, according to this determination, the reference terrain collision location decider 161 once again determines the collision location in which location the moving object collided in the reference terrain according to the moving trajectory of the moving object received from the moving object trajectory generator 110.

Figure 4:
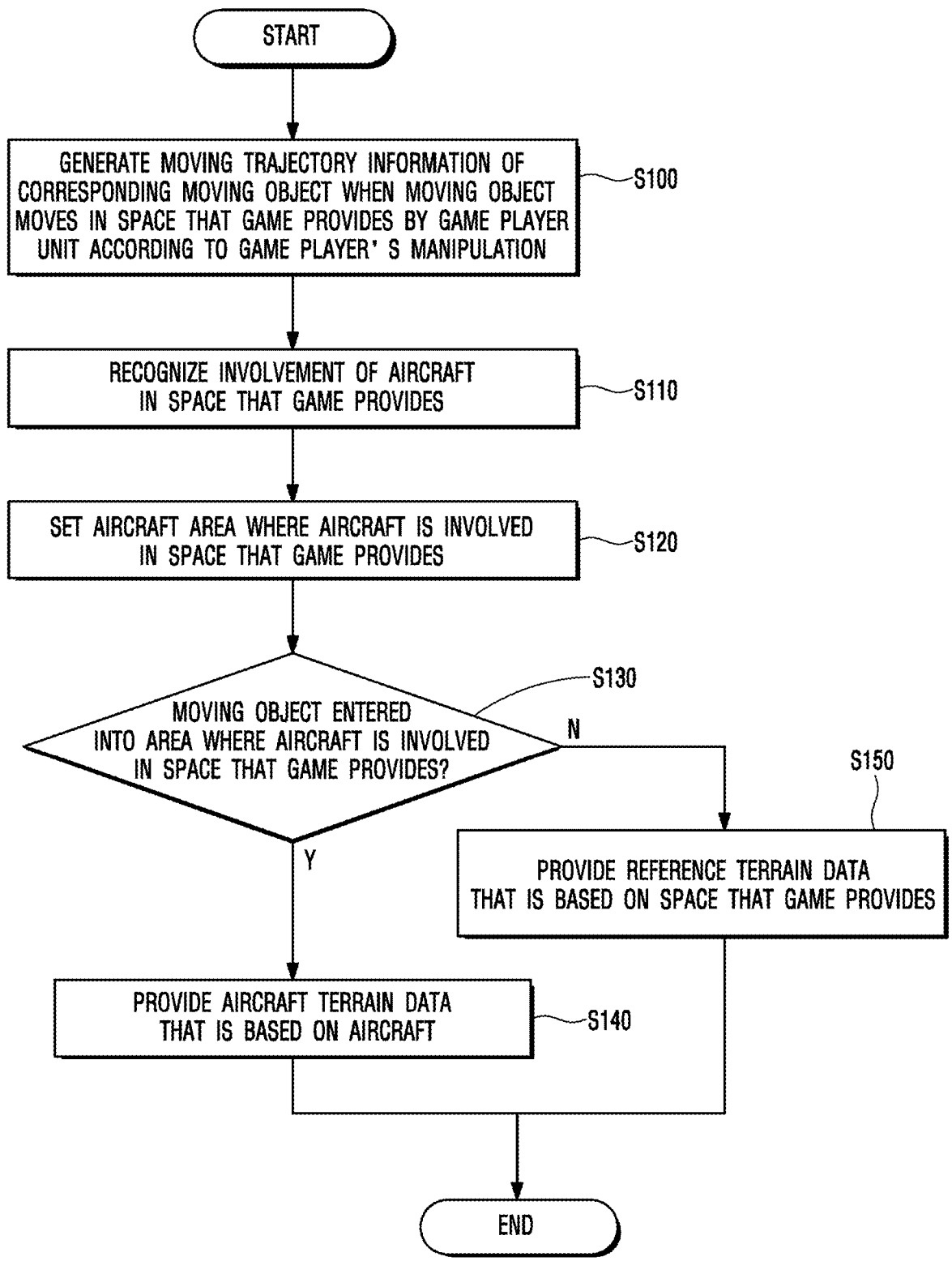
FIG. 4 is a flowchart for describing a sequence of a method for improving the processing speed of a game implementing multithreaded according to an embodiment of the present disclosure.

FIG. 4 is a flowchart for describing a sequence of a method for improving the processing speed of a game implementing multithreaded according to the present disclosure.

Referring to FIG. 4, a method for improving the processing speed of a game implementing multithreaded according to the present disclosure is to use the apparatus for improving the processing speed of a game implementing multithreaded described above, and thus repetitive description will be omitted.

First, when a moving object moves in a game space according to a game player's manipulation, a moving trajectory of the corresponding moving object is generated (S100).

Step S100 generates coordinates (X, Y, Z) information of the moving trajectory of the moving object in the reference terrain coordinates system that is based on the space that the game provides.

Next, involvement of an aircraft is recognized in the space that the game provides (S110).

Next, when the involvement of the aircraft is recognized in the space that the game provides, an aircraft area is set (S120).

At step S120, the aircraft area may be set according to a flying route of the aircraft and geometry information of the aircraft.

Next, it is determined whether the moving object entered into the aircraft area (S130).

Step S130 determines whether the moving object entered into the aircraft area based on a result of comparing coordinates range information of the aircraft area and coordinates information of the moving trajectory of the moving object.

When it is determined that the moving object entered into the aircraft area at step S130, the terrain data manager 150 provides aircraft terrain data that is based on the aircraft instead of the reference terrain data (S140).

On the other hand, when it is determined that the moving object did not enter into the aircraft area at step S130, the terrain data manager 150 keeps providing the reference terrain data (S150).

Figure 5:
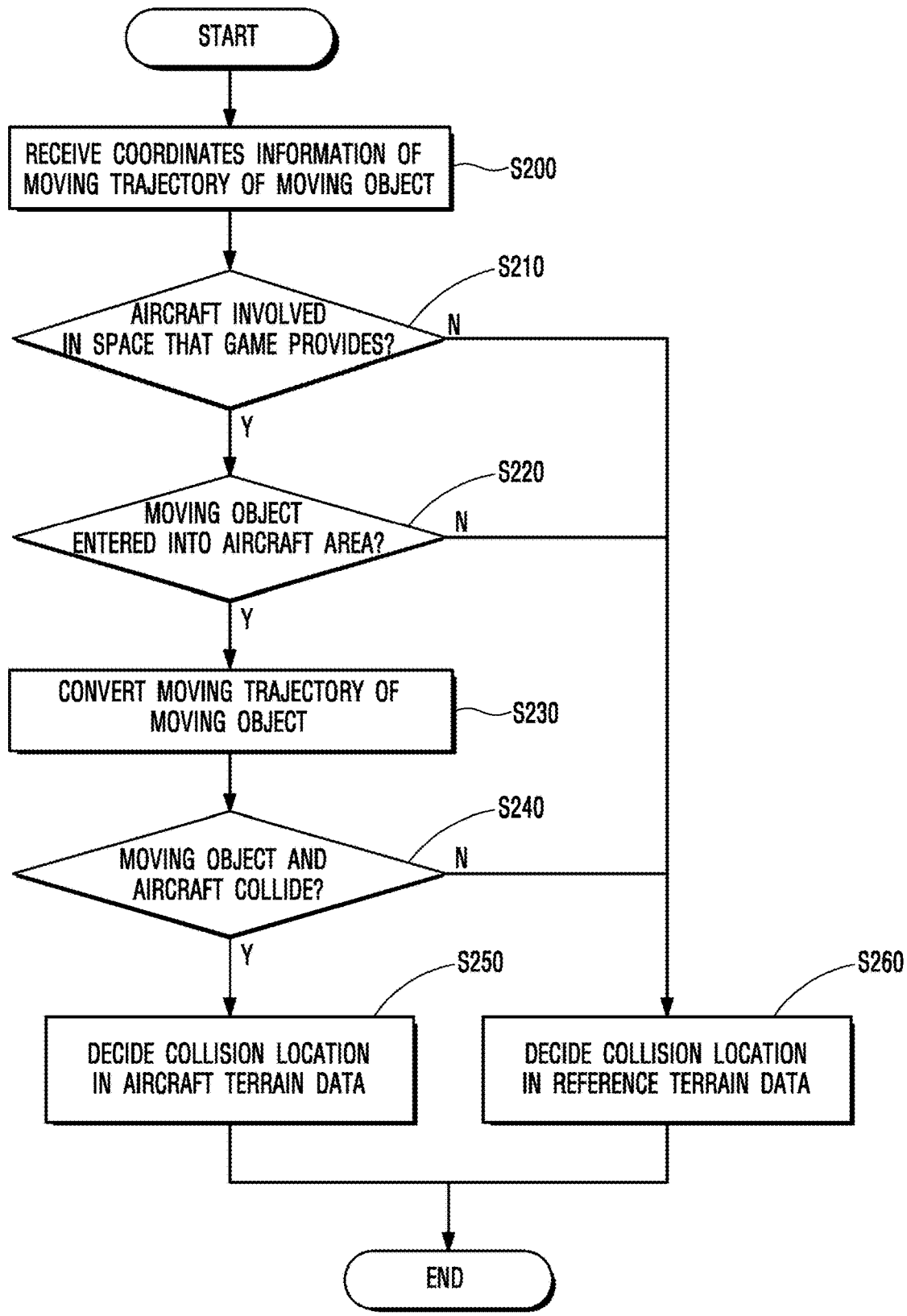
FIG. 5 is a flowchart for describing a sequence of a method for deciding a collision location of the moving object in an embodiment of the present disclosure.

FIG. 5 is a flowchart for describing a sequence of a method in which the collision location decider decides a collision location of the moving object.

Referring to FIG. 5, the method in which the collision location decider decides the collision location of the moving object according to the present disclosure, first of all, receives information of the moving trajectory of the moving object generated in the reference terrain coordinates system (S200).

Next, whether the aircraft is involved is determined (S210).

Determining whether the aircraft is involved at step S210 may be performed using information from the aircraft involvement recognizer 120.

When it is determined at step S210 that the aircraft is not involved, the collision location of the moving object is decided using the reference terrain data and the moving trajectory of the moving object (S260).

On the other hand, when it is determined at step S210 that the aircraft is involved, it is determined whether the moving object entered into the aircraft area (S220).

Determining whether the moving object entered into the aircraft area at step S220 may be performed using information from the moving object entry determiner 140. Otherwise, it may be determined based on whether the aircraft terrain data is provided.

When it is determined at step S220 that the moving object did not enter into the aircraft area, the collision location of the moving object is decided using the reference terrain data and the moving trajectory of the moving object (S260).

On the other hand, when it is determined at step S220 that the moving object entered into the aircraft area, the moving trajectory of the moving object generated in the reference terrain coordinates system is converted into the moving trajectory in the aircraft terrain coordinates system (S230). Here, conversion into the moving trajectory in the aircraft terrain coordinates system is made using positional relationship between an original point of the reference terrain and the aircraft.

In addition, the collision location is decided in the aircraft terrain data (S250).

More specifically, as illustrated in FIG. 5, upon determining whether the moving object and the aircraft collided with each other at step S240, the collision location is decided in the aircraft terrain data.

Determining whether the moving object and the aircraft collided with each other at step S240 is performed based on whether there are overlapping coordinates upon comparing the converted coordinates of the moving trajectory of the moving object and the aircraft geometry coordinates in the aircraft terrain data.

When it is determined at step S240 that the moving object and the aircraft collided with each other, the collision location of the moving object is decided using the aircraft terrain data and the converted moving trajectory of the moving object (S250). Specifically, the overlapping coordinates of the converted coordinates of the moving trajectory of the moving object and the aircraft geometry coordinates are decided as the collision location.

On the other hand, when it is determined at step S240 that the moving object and the aircraft did not collide with each other, it is determined that the moving object entered into the aircraft area but passed the aircraft without colliding with the aircraft, and proceeds to step S260.

According to the collision location of the moving object decided by the method described above, an event result is computed regarding the moving object and the collision location and conversion of the objects existing near the collision location, and the computed event result may be provided to the gaming device.

As such, when the coordinates information of the moving trajectory of the moving object is included in the coordinates range information of the area where the aircraft is involved, the apparatus and method for improving the processing speed of a game implementing multithreaded according to the present disclosure determines that the moving object entered into the area where the aircraft is involved and provides the aircraft terrain data. Thereafter, the moving trajectory of the moving object is converted into the moving trajectory in the aircraft terrain coordinates system, and the collision location is decided in the aircraft terrain data. Therefore, even when an aircraft is involved in the game, the reference terrain data that is being shared by all gaming devices need not be modified or changed, and therefore, the processing speed of the game can be improved.

The functional operations described so far in the present specification and embodiments related to the subject may be implemented in a digital electronic circuit, computer software, firmware or hardware, including the structures disclosed in the present specification and structural equivalents thereof, or in combinations of one or more thereof.

Embodied forms of the subject disclosed in the present specification may be implemented in one or more computer program products, in other words, may be implemented as one or more modules relating to computer program instructions encoded on a tangible program medium to be executed by an information processing apparatus or for operation of movements thereof. The tangible program medium may be a radio wave signal or a computer-readable medium. A radio wave signal is an artificially generated signal, e.g. a machine-generated electrical, optical or electromagnetic signal, created to encode information for transmission to an appropriate receiver device for execution by a computer. A computer readable medium may be a machine-readable storage device, a machine-readable storage substrate, a memory device, a combination of materials that affect a machine-readable radio wave signal, or a combination of one or more thereof.

Computer programs (also known as programs, software, software applications, scripts, or codes) can be written in any form of a programming language including a compiled or interpreted language or a priori or procedural language, and can be deployed in any form including stand-alone programs or modules, components, subroutines, or other units suitable for use in a computer environment.

Computer programs do not necessarily correspond to files of a file device. Programs may be stored in a single file provided in the requested program, or in multiple interacting files (for example, one or more files that store modules, subprograms or a portion of codes), or in a portion of a file that possesses other programs or information (for example, one or more scripts that are stored in a markup language document).

Computer programs may be located at one site or distributed over a plurality of sites, and may be deployed to be executed on multiple computers interconnected by a communication network or on one computer.

Additionally, the logical flows and structural block diagrams described in the present patent document describe the corresponding actions and/or specified methods supported by the corresponding functions and steps supported by the disclosed structural means, and may also be used to build corresponding software structures and algorithms and equivalents thereof.

The processes and logical flows described in the present specification may be performed by one or more programmable processors that execute one or more computer programs in order to perform functions by operating on input information and generating outputs.

Processors suitable for execution of computer programs include, for example, both general-purpose and special-purpose microprocessors, and any one or more processors of any kind of digital computers. In general, a processor will receive instructions and information from a read-only memory or a random access memory or both.

Key elements of a computer are one or more memory devices for storing instructions and information, and a processor for performing the instructions. Further, computers will be combined to be operable to receive and/or transmit information to and/or from one or more massive storage devices, such as, for example, magnetic, magneto-optical disks or optical disks. However, computers need not have such a device.

The disclosed description presents the optimal mode of the present disclosure, and provides examples to describe the present disclosure, and to enable those skilled in the art to prepare and use the present disclosure. This specification written as such is not intended to limit the present disclosure to the specific terms presented.

Therefore, although the present disclosure is described with reference to the aforementioned examples, those skilled in the art will be able to modify, alter and change those examples without departing from the scope of the present disclosure. In short, in order to achieve the intended effects of the present disclosure, it is not necessary to separately include all functional blocks shown in the drawings or to follow all the orders shown in the drawings as shown in the order shown, and still it may fall within the technical scope of the invention.

What is claimed is:

1. An apparatus for improving the processing speed of a game implementing multithreaded, the apparatus comprising:
   a moving object trajectory generator that generates a moving trajectory of a moving object in a reference terrain coordinates system that is based on a space that the game provides, when the moving object moves in the space that the game provides according to a game player's manipulation;
   an aircraft involvement recognizer that recognizes involvement of an aircraft in the space that the game provides;
   an aircraft area setter that sets an aircraft area where the aircraft is involved in the space that the game provides, when the involvement of the aircraft is recognized in the space that the game provides;
   a moving object entry determiner that determines whether the moving object enters into the aircraft area in the space that the game provides;
   a terrain data manager that provides aircraft terrain data that is based on the aircraft, when it is determined that the moving object enters into the aircraft area; and
   a collision location decider that decides a collision location of the moving object using based on the aircraft terrain data.

2. The apparatus for improving the processing speed of a game implementing multithreaded, according to claim 1, wherein the aircraft area setter sets the aircraft area according to a location and a shape of the aircraft.

3. The apparatus for improving the processing speed of a game implementing multithreaded, according to claim 1, wherein the moving object entry determiner includes a moving object entry decider that decides that the moving object enters into the aircraft area, when, as a result of comparing coordinates of the moving trajectory and a coordinates range of the aircraft area, the coordinates of the moving trajectory are included in the coordinates range of the aircraft area.

4. The apparatus for improving the processing speed of a game implementing multithreaded, according to claim 1, wherein the collision location decider includes a reference terrain collision location decider that decides a collision location in reference terrain data that is based on the space that the game provides; and
   an aircraft collision location decider that decides the collision location in aircraft terrain data.

5. The apparatus for improving the processing speed of a game implementing multithreaded, according to claim 4, wherein the aircraft collision location decider includes a moving trajectory converter that converts the moving trajectory in the reference terrain coordinates system into the moving trajectory in an aircraft terrain coordinates system, and
   the aircraft collision location decider decides the collision location based on converted coordinates of the moving trajectory and aircraft geometry coordinates of the aircraft terrain data.

6. A method for improving the processing speed of a game implementing multithreaded, the method comprising:
   generating, by a moving object trajectory generator, a moving trajectory of a moving object in a reference terrain coordinates system that is based on a space that the game provides, when the moving object moves in the space that the game provides, according to a game player's manipulation;
   recognizing, by an aircraft involvement recognizer, involvement of an aircraft in the space that the game provides;
   setting, by an aircraft area setter, an aircraft area where the aircraft is involved in the space that the game provides, when the involvement of the aircraft is recognized;
   determining, by a moving object entry determiner, whether the moving object enters into the aircraft area where the aircraft is involved in the space that the game provides;
   providing, by a terrain data manager, aircraft terrain data that is based on the aircraft, when it is determined that the moving object enters into the aircraft area; and
   deciding, by a collision location decider, a collision location of the moving object based on the aircraft terrain data.

7. The method for improving the processing speed of a game implementing multithreaded, according to claim 6, wherein the determining whether the moving object enters into the aircraft area includes:
   comparing coordinates range information of the aircraft area and coordinates of the moving trajectory of the moving object; and
   determining that the moving object enters into the aircraft area, when, as a result of the comparison, the coordinates of the moving trajectory of the moving object are included in the coordinates range information of the aircraft area, and determining that the moving object does not enter into the aircraft area, when the coordinates of the moving trajectory of the moving object are not included in the coordinates range information of the aircraft area.

8. The method for improving the processing speed of a game implementing multithreaded, according to claim 6, wherein the deciding the collision location of the moving object includes deciding the collision location in aircraft terrain data, when the moving object enters into the aircraft area; and
   deciding the collision location in reference terrain data that is based on the space that the game provides, when the moving object does not enter into the aircraft area.

9. The method for improving the processing speed of a game implementing multithreaded, according to claim 8, wherein the deciding the collision location in the aircraft terrain data includes converting the moving trajectory in the reference terrain coordinates system into the moving trajectory in an aircraft terrain coordinates system that is based on the aircraft;

comparing the converted coordinates of the moving trajectory and aircraft geometry coordinates in the aircraft terrain data; and when, as a result of the comparison, converted coordinates of the moving trajectory and the aircraft geometry coordinates overlap each other, determining the overlapping coordinates as the collision location, and when the converted coordinates of the moving trajectory and the aircraft geometry coordinates do to overlap each other, proceeding to determining the collision location in the reference terrain data.

10. The method for improving the processing speed of a game implementing multithreaded, according to claim 6, further comprising providing a result of an event regarding changes of objects existing near the collision location and the collision location.

\* \* \* \* \*